(12) United States Patent
Yang et al.

(10) Patent No.: US 9,108,611 B2
(45) Date of Patent: Aug. 18, 2015

(54) ELECTRIC BRAKE SYSTEM FOR VEHICLE

(71) Applicant: MANDO CORPORATION, Pyeongtaek-si, Gyeonggi-do (KR)

(72) Inventors: I Jin Yang, Seongnam-si (KR); Seong Ho Choi, Anyang-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/068,491

(22) Filed: Oct. 31, 2013

(65) Prior Publication Data

US 2014/0117747 A1    May 1, 2014

(30) Foreign Application Priority Data

Oct. 31, 2012  (KR) ........................ 10-2012-0121859

(51) Int. Cl.
| | |
|---|---|
| *B60T 13/74* | (2006.01) |
| *B60T 7/04* | (2006.01) |
| *B60T 13/66* | (2006.01) |
| *B60T 13/68* | (2006.01) |
| *B60T 8/40* | (2006.01) |

(52) U.S. Cl.
CPC ............... *B60T 13/745* (2013.01); *B60T 7/042* (2013.01); *B60T 13/662* (2013.01); *B60T 13/686* (2013.01); *B60T 8/4081* (2013.01)

(58) Field of Classification Search
CPC ..... B60T 7/042; B60T 8/4081; B60T 13/662; B60T 13/686; B60T 13/745
USPC ......................................... 303/115.2, 155, 87
See application file for complete search history.

(56) References Cited

U.S. PATENT DOCUMENTS

| | | | | |
|---|---|---|---|---|
| 5,288,142 A | * | 2/1994 | Burgdorf | .................... 303/113.2 |
| 5,836,659 A | * | 11/1998 | Feigel et al. | ............... 303/115.2 |
| 6,007,161 A | * | 12/1999 | Worsdorfer | ................ 303/115.2 |
| 6,149,249 A | * | 11/2000 | Matsuda | .................... 303/115.2 |
| 6,357,835 B1 | * | 3/2002 | Boisseau | .................... 303/113.5 |
| 7,798,577 B2 | | 9/2010 | Bond et al. | |
| 8,226,176 B2 | * | 7/2012 | Hatano | .................... 303/122.13 |

FOREIGN PATENT DOCUMENTS

| | | |
|---|---|---|
| JP | 2011073535 A | 4/2011 |
| KR | 1020080054003 A | 6/2008 |
| KR | 1020110011938 A | 2/2011 |
| KR | 10-1090910 | 12/2011 |

\* cited by examiner

*Primary Examiner* — Bradley King
(74) *Attorney, Agent, or Firm* — Lowe Hauptman & Ham, LLP

(57) ABSTRACT

Disclosed herein is an electric brake system for a vehicle including a reservoir, an input rod, and a pedal displacement sensor to sense a displacement of a brake pedal. The electric brake system includes a pressure supply unit connected to the reservoir and a hydraulic channel and to output an electrical signal through the pedal displacement sensor, a hydraulic control unit provided with a first circuit and a second circuit, a shut-off valve to control the hydraulic pressure transferred to a wheel cylinder, a switching valve connected to a channel connecting the pressure supply unit to the hydraulic control unit, a compliance unit installed in a channel connected to the shut-off valve and the switching valve and including a compliance chamber, a piston and an elastic member, a simulator connected to the master cylinder to provide reaction force, and an electronic control unit to control the motor and the valves.

11 Claims, 3 Drawing Sheets

ELECTRIC BRAKE SYSTEM FOR VEHICLE

CROSS-REFERENCE TO RELATED APPLICATION(S)

This application claims the benefit of Korean Patent Application No. 2012-0121859, filed on Oct. 31, 2012 in the Korean Intellectual Property Office, the disclosure of which is incorporated herein by reference.

BACKGROUND

1. Field

Embodiments of the present invention relate to an electric brake system which has a simplified structure and allows precise pressure control.

2. Description of the Related Art

A brake system for braking of a vehicle is essentially mounted on a vehicle, and various systems have recently been proposed to obtain stronger and more stable braking force. Examples of brake systems include an anti-lock braking system (ABS), a brake traction control system (BIOS), and a vehicle dynamic control system (VDC). The ABS prevents wheels from skidding upon braking. The BTCS prevents slippage of driving wheels during rapid acceleration from a stop or upon sudden acceleration of a vehicle. The VDC maintains a stable driving state of a vehicle by controlling a brake oil pressure through a combination of the ABS and the BTCS.

Such an electric brake system includes a plurality of solenoid valves to control a braking oil pressure transmitted to a wheel cylinder (a hydraulic brake) mounted on a wheel of a vehicle, a pair of a low-pressure accumulator and a high-pressure accumulator to temporarily store oil flowing out of the wheel cylinder, a motor and a pump to forcibly pump the oil in the low-pressure accumulator, a plurality of check valves to prevent reverse flow of the oil, and an electronic control unit (ECU) to control the operations of the solenoid valves and the motor. These constituents are compactly installed in a hydraulic block formed of aluminum.

The structure of such a brake system is disclosed in Korean Patent No. 10-1090910. According to this document, the brake system drives the motor and the pump to fill the high-pressure accumulator and/or the low-pressure accumulator with hydraulic pressure and controls increase, decrease and maintenance of the hydraulic pressure by opening and closing the electric solenoid valves. Accordingly, the structure of the brake system is complex.

In addition, there is a predetermined gap between an input rod, which applies pressure to a master cylinder according to foot force applied to the brake pedal, and the master cylinder. Accordingly, when a driver operates the brake system, a lost travel section of pedal stroke is produced. This may cause the driver to feel that the brake is not functioning properly and be dissatisfied with braking, and may even lead to an accident. Further, pedal feel may be degraded.

CITED REFERENCE

Patent Document

Korean Patent No. 10-1090910 (Dec. 1, 2011)

SUMMARY

Therefore, it is an aspect of the present invention to provide an electric brake system for a vehicle that may have a simplified configuration, provide a stable pedal feel during braking, and allow precise pressure control.

It is another aspect of the present invention to provide an electric brake system for a vehicle which allows braking to be implemented by a driver's foot force even when the brake system abnormally operates, and allows immediate creation of pressure according to the foot force applied to the brake pedal, without a lost travel section.

Additional aspects of the invention will be set forth in part in the description which follows and, in part, will be obvious from the description, or may be learned by practice of the invention.

In accordance with one aspect of the present invention, an electric brake system for a vehicle including a reservoir to store oil, a master cylinder provided with two hydraulic circuits and adapted to generate hydraulic pressure using the oil stored in the reservoir, an input rod disposed to contact the master cylinder to move forward according to foot force from a driver, and a pedal displacement sensor to sense a displacement of a brake pedal connected to the input rod, includes a pressure supply unit connected to the reservoir and a hydraulic channel to receive oil and to output an electrical signal through the pedal displacement sensor to operate a motor when the driver operates the brake pedal such that rotational force of the motor is converted into rectilinear motion, a hydraulic control unit provided with a first circuit provided with at least one first wheel and a second circuit provided with at least one second wheel in order to perform braking of a wheel with hydraulic pressure supplied according to force generated by the pressure supply unit, a shut-off valve to control the hydraulic pressure transferred from the master cylinder to a wheel cylinder installed at each wheel, a switching valve connected to a channel connecting the pressure supply unit to the hydraulic control unit to control the hydraulic pressure, a compliance unit installed in a channel connected to the shut-off valve and the switching valve and including a compliance chamber having a predetermined volume varying according to change in pressure, and a piston and an elastic member arranged in the compliance chamber, a simulator connected to the master cylinder to provide reaction force according to the foot force applied to the brake pedal, and an electronic control unit to control the motor and the valves based on information about pressure and pedal displacement.

The compliance unit may further include a compliance valve arranged at an inlet of the compliance chamber.

The compliance valve may be a Normally Closed solenoid valve that remains closed in a normal state and is opened upon receiving a signal for an opening operation from the electronic control unit.

The pressure supply unit may include a pressure chamber connected to the hydraulic channel to receive oil supplied thereto, a hydraulic piston arranged in the pressure chamber, a hydraulic spring arranged in the pressure chamber to elastically support the hydraulic piston, the motor to generate rotational force according to the electrical signal from the pedal displacement sensor, and a ball-screw member configured with a screw and a bolt to convert rotational motion of the motor into rectilinear motion, wherein the hydraulic piston may be connected to the screw adapted to rectilinearly move such that the oil in the pressure chamber is pressurized by the screw.

A check valve may be installed in the hydraulic channel to prevent backflow of pressure from the pressure chamber and to allow the oil to be suctioned into and stored in the pressure chamber when the hydraulic piston returns.

The electric brake system may further include a first inflow channel to connect the pressure supply unit to the first circuit, and a second inflow channel branched from the first inflow channel and connected to the second circuit, wherein the switching valve may include a first switching valve installed in the first inflow channel to control the hydraulic pressure, and a second switching valve installed in the second inflow channel to control the hydraulic pressure.

A check valve may be installed in parallel with the first and second switching valves, The first and second switching valves may be Normally Closed solenoid valves that remain closed in a normal state and are opened upon receiving a signal for an opening operation from the electronic control unit.

The hydraulic control unit may include a Normally Opened solenoid valve disposed upstream of the wheel cylinder to control transfer of the hydraulic pressure to the wheel cylinder, a Normally Closed solenoid valve disposed downstream of the wheel cylinder to control release of the hydraulic pressure from the wheel cylinder, and a return channel to connect the Normally Closed solenoid valve to the hydraulic channel.

The electric brake system may further include first and second backup channels to connect the two hydraulic circuits of the master cylinder to the wheel cylinder to control the oil when the electric brake system malfunctions, wherein the shut-off valve may include a first shut-off valve installed in the first backup channel to control connection between the first backup channel and the master cylinder, and a second shut-off valve installed in the second backup channel to control connection between the second backup channel and the master cylinder.

The first and second shut-off valves may be Normally Opened solenoid valves that remain opened in a normal state and are closed upon receiving a signal for a closing operation from the electronic control unit.

The simulator may include a simulation chamber to store the oil discharged from the master cylinder, a reaction piston arranged in the simulation chamber, a reaction spring to elastically support the reaction piston, and a simulation valve arranged at an inlet of the simulation chamber.

The simulation valve may be a Normally Closed solenoid valve that remains closed in a normal state and is opened upon receiving a signal for an opening operation from the electronic control unit.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
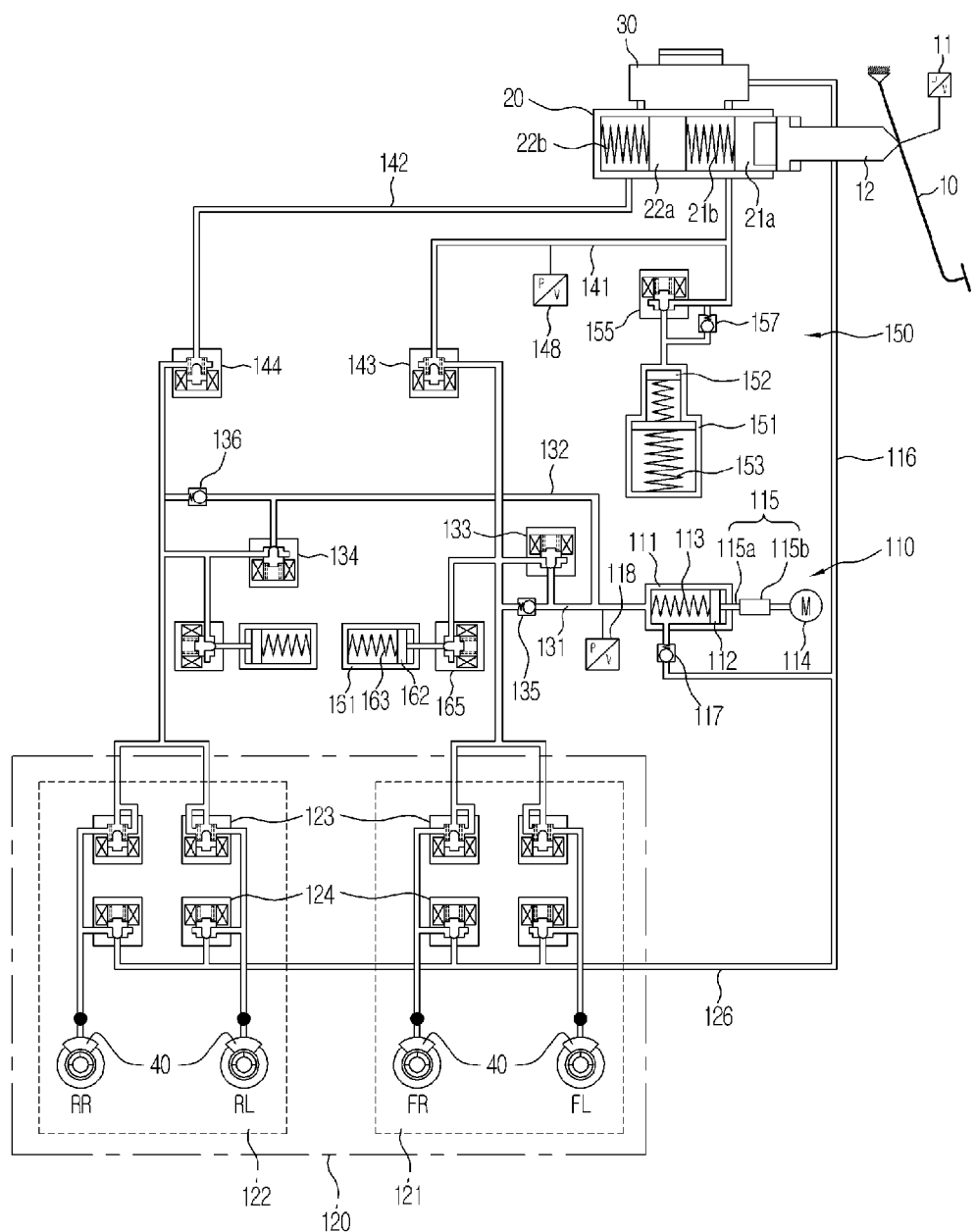
FIG. 1 is a view showing hydraulic circuits of an electric brake system for a vehicle according to an embodiment of the present invention, which is not in operation.

Reference will now be made in detail to the embodiments of the present invention, examples of which are illustrated in the accompanying drawings, wherein like reference numerals refer to like elements throughout.

FIG. 1 is a view showing a hydraulic circuit of an electric brake system for a vehicle according to an embodiment of the present invention, which is not in operation.

Referring to FIG. 1, an electric brake system for a vehicle generally includes, a master cylinder 20 to generate hydraulic pressure, a reservoir 30 coupled to the upper portion of the master cylinder 20 to store oil, an input rod 12 to apply pressure to the master cylinder 20 according to a foot force applied to a brake pedal 10, wheel cylinders 40 to perform braking of the respective wheels RR, RL, FR and FL when the oil in the reservoir 20 is transferred thereto, and a pedal displacement sensor 11 to sense displacement of the brake pedal 10.

Herein, the master cylinder 20 may be provided with at least one chamber to generate hydraulic pressure. Referring to FIG. 1, the master cylinder 20 is provided with a first cylinder 21a and a second cylinder 22a to have two hydraulic circuits, and contacts the input rod 12. Providing the master cylinder 20 with two hydraulic circuits is intended to secure safety in the event of malfunction. For example, the first one of the two hydraulic circuits is connected to the front right wheel FR and the rear left wheel RL of the vehicle, and the other one of the hydraulic circuits is connected to the front left wheel FL and the rear right wheel RR. Typically, the first one of the two hydraulic circuits is connected to the two front wheels FR and FL, and the other one of the hydraulic circuits is connected to the two rear wheels RR and RL. By configuring the two circuits to be independent from each other, braking of the vehicle remains possible even when one of the hydraulic circuits malfunctions.

The first cylinder 21a and the second cylinder 22a of the master cylinder 20 configured as above are respectively provided with a first spring 21b and a second spring 22b. The first spring 21b and the second spring 22b store elastic force when the first cylinder 21a and the second cylinder 22a are compressed. When the force pushing the first cylinder 21a becomes weaker than the elastic force, the elastic force pushes the first and second pistons 21a and 22a back to original positions thereof.

The input rod 12 to apply pressure to the first cylinder 21a of the master cylinder 20 closely contacts the first cylinder 21a. Thereby, there is no gap between the master cylinder 20 and the input rod 12. That is, when the brake pedal 10 is pressed, the master cylinder 20 is directly pressed with the lost travel section.

The electric brake system for a vehicle according to one embodiment of the present invention includes a pressure supply unit 110 to operate by receiving a driver's intention to implement braking in the form of an electrical signal from the pedal displacement sensor 11 that senses displacement of the brake pedal 10, a hydraulic pressure control unit 120 to perform braking of the wheels using the force generated by the pressure supply unit 110, switching valves 133 and 134 installed in a channel connecting the pressure supply unit 110 to the hydraulic pressure control unit 120 in order to control hydraulic pressure, shut-off valves 143 and 144 to control hydraulic pressure transferred from the master cylinder 20 to the wheel cylinders 40, a compliance unit 160 installed in the channel having the shut-off valves 143 and 144 and the switching valves 133 and 134 connected thereto and having a volume varying according to change in pressure, and a simulator 150 connected to the master cylinder 20 to supply reaction force to the brake pedal 10.

The pressure supply unit 110 includes a pressure chamber 111 having a predetermined space therein to store oil supplied thereto, a hydraulic piston 112 and a hydraulic spring 113 arranged in the pressure chamber 111, a motor 114 to produce rotational force according to an electrical signal from the pedal displacement sensor 11, a ball screw member 115 configured with a screw 115a and a bail nut 115b to convert the rotational motion of the motor 114 into rectilinear motion, and a hydraulic channel 116 to connect the reservoir 20 to the pressure chamber 111 to allow oil to be supplied to the pressure chamber 111. Herein, a signal sensed by the pedal displacement sensor 11 is transmitted to an electronic control unit (ECU) (not shown). The ECU controls the motor 114 and the valves provided to the brake system of the present invention, which will be described later. Control of a plurality of valves according to displacement of the brake pedal 10 will be described below.

As discussed above, the pressure chamber 111 is connected to the reservoir 30 by the hydraulic channel 116 to store the oil supplied thereto. The pressure chamber 111 is provided with the hydraulic piston 112 and the hydraulic spring 113 to elastically support the hydraulic piston 112. The hydraulic piston 112 is connected to the screw 115a of the ball screw member 115 to apply pressure to the pressure chamber 111 through rectilinear movement of the screw 115a. The hydraulic spring 113 functions to return the hydraulic piston 112 to an original position thereof.

The motor 114 is an electric motor that generates rotational force based on a signal output from the ECU. The motor 114 is caused to generate rotational force for forward or reverse rotation by the ECU. Herein, the ball nut 115b of the ball screw member 115 that converts rotational force into rectilinear motion not only functions as an axis of rotation of the motor 114, but also functions to rectilinearly move the screw 115a. Although not shown in FIG. 1, a spiral groove is formed in the outer circumferential surface of the screw 115a. The ball nut 115b is rotatably coupled through the spiral groove and a plurality of balls. That is, as disclosed above, the hydraulic piston 112 is pressed by rectilinear motion of the screw 115a to generate hydraulic pressure.

According to this embodiment, a check valve 117 is installed in the hydraulic channel 116 to prevent backward transfer of pressure in the pressure chamber 111. The check valve 117 not only serves to prevent backward transfer of pressure in the pressure chamber 111, but also serves to cause the oil to be suctioned into and stored in the pressure chamber 111 when the hydraulic piston 112 returns.

Reference numeral '118' denotes a first pressure sensor to sense hydraulic pressure in the pressure chamber 111.

The hydraulic pressure control unit 120 is provided with a first circuit 121 to receive hydraulic pressure supplied thereto to control braking of at least one first wheel, and a second circuit 122 to receive hydraulic pressure supplied thereto to control braking of at least one second wheel. Thereby, the hydraulic pressure control unit 120 includes two wheel braking circuits. Herein, the at least one first wheel may include front wheels FR and FL, while the at least one second wheel may include rear wheels RR and RL. Each of the wheels FR, FL, RR, and RL is provided with a wheel cylinder 40 to perform braking when hydraulic pressure is supplied thereto. That is, each of the circuits 121 and 122 includes a channel connected to the wheel cylinders 40. The channel is provided with a plurality of valves 123 and 124 to control hydraulic pressure.

Referring to FIG. 1, the valves 123 and 124 are divided into a Normally Open type (hereinafter, referred to as 'NO type') solenoid valve 123 disposed upstream of the wheel cylinders 40 to control transfer of hydraulic pressure to the wheel cylinders, and a Normally Closed type (hereinafter, referred to as 'NC type') solenoid valve 124 disposed downstream of the wheel cylinders 40 to control release of hydraulic pressure from the wheel cylinders 40. Opening and closing of such solenoid valves 123 and 124 are controlled by the ECU.

The hydraulic pressure control unit 120 includes a return channel 126 connecting the NC type solenoid valve 124 to the hydraulic channel 116. The return channel 126 allows the hydraulic pressure transferred to the wheel cylinders 40 to be discharged therethrough and transferred to the reservoir 30 or the pressure supply unit 110.

According to this embodiment, the electronic bake system includes inflow channels 131 and 132 that connect the pressure supply unit 110 to the first and second circuits 121 and 122 of the hydraulic pressure control unit 120. The first switching valve 133, which controls transfer of hydraulic pressure to the wheel cylinder 40 of the first circuit 121 through the opening and closing operation, is installed in the first inflow channel 131. The second switching valve 134, which controls transfer of hydraulic pressure to the wheel cylinder 40 of the second circuit 122 through the opening and closing operation, is installed in the second inflow channel 132. Herein, the second inflow channel 132 is branched from the first inflow channel and connected to the second circuit 122. Opening and closing of the first and second switching valves 133 and 134 are controlled by the ECU to directly transfer the hydraulic pressure generated by the pressure supply unit 110 to the wheel cylinders 40. That is, the first switching valve 133 controls the hydraulic pressure supplied to the first circuit 121, and the second switching valve 134 controls the hydraulic pressure supplied to the second circuit 122.

The first and second switching valves 133 and 134 are NC type solenoid valves which remain closed in a normal state and operate to be opened when receiving a signal for the opening operation from the ECU. Although not shown, the first switching valve 133 may be an NO type solenoid valve which remain open in a normal state and are closed upon receiving a signal for the closing operation. That is, when the first switching valve 133 is an NO valve, operation thereof may be facilitated since it is opened without application of electrical power.

Meanwhile, check valves 135 and 136 are installed in parallel with the first and second switching valves 133 and 134 disposed at the locations where the pressure chamber 111 is connected to the circuits 121 and 122. The check valves includes a first check valve 135 disposed in parallel with the first switching valve 133 and a second check valve 135 disposed in parallel with the second switching valve 134. The check valves 135 and 136 are one-way check valves that allows hydraulic pressure to be transferred only to the wheel cylinders 40, and function to prevent increase in pressure due to the delayed operation of the first and second switching valves 133 and 134.

According to this embodiment, in case of malfunction of the electric brake system for a vehicle, a first backup channel 141 and a second backup channel 142 may be arranged between the master cylinder 20 having two hydraulic circuits and the wheel cylinders 40. A first shut-off valve 143 to open and dose the first backup channel 141 is provided in the middle of the first backup channel 141, and a second shut-off valve 144 to open and dose the second backup channel 142 is provided in the middle of the second backup channel 142. The first backup channel 141 is connected to the first circuit 121 via the first shut-off valve 143, and the second backup channel 142 is connected to the second circuit 122 via the second shut-off valve 144. Particularly, a second pressure sensor 148 to measure the oil pressure of the master cylinder 20 may be provided between the first shut-off valve 143 and the master cylinder 20. When braking is performed by the driver, the backup channels 141 and 142 may be shut off by the first shut-off valve 143 and the second shut-off valve 144, and braking intended by the driver may be determined by the pressure sensor 148.

The first and second shut-off valves 143 and 144 are NC type solenoid valves which remain open in the normal state and are closed upon receiving a signal for the closing operation from the ECU.

According to this embodiment, the compliance units 160 are installed in the channels to which the switching valves 133 and 134 and the shut-off valves 143 and 144 are connected. According to the illustrated embodiment, the compliance units 160 are installed between the first switching valve 133 and the first shut-off valve 143 and between the second switching valve 134 and the second shut-off valve 144. Herein, the compliance units 160 are adapted to store hydraulic pressure generated by the pressure supply unit 110. The compliance units 160 have the same configuration and the same function. That is, the two compliance units 160 independently supply hydraulic pressure to the first circuit 121 and the second circuit 122.

Each of the compliance units 160 is provided with a compliance chamber 161 having a predetermined volume to store hydraulic pressure, and a compliance valve 165 provided at the inlet of the compliance chamber 161. A piston 162 and an elastic member 163 are arranged in the compliance chamber 161 such that the volume of the compliance chamber 161 is changed within a certain range by the hydraulic pressure introduced into the compliance chamber 161. The compliance valve 165 is an NC type solenoid valve which remains closed in a normal state and is opened upon receiving a signal for the opening operation from the ECU.

In the case that the ABS cycle is maintained for a long time during braking, for example, generation of braking pressure by the pressure supply unit 110 is blocked. In this case, the ECU (not shown) senses the situation and causes the compliance unit 160 to supply the hydraulic pressure to the wheel cylinders 40. Specifically, in the case that generation of braking pressure by the pressure supply unit 110 is blocked, the first switching valve 131 is closed, and the pressure piston 112 in the pressure chamber 111 quickly moves backward to suction in the oil from the reservoir 20 through the hydraulic channel 116 and then moves forward again to create hydraulic pressure. While the time the pressure chamber 111 suctions and compresses the oil, the hydraulic pressure is transferred from the compliance unit 116 to the wheel cylinders 40. Thereby, drop in supplied pressure may be prevented. Accordingly, problems in controlling the ABS mode and braking of the vehicle caused by drop in supplied pressure may be addressed.

While the compliance unit 160 is illustrated as being provided with the compliance valve 165 to store hydraulic pressure in the compliance chamber 161 to supply the stored hydraulic pressure to the wheel cylinders 40 according to opening and closing of the valve, embodiments of the present invention are not limited thereto. The compliance unit 160 may be used without the compliance valve 165. For example, a structure without a compliance valve is shown in FIG. 3. In FIG. 3, reference numerals identical to those in FIGS. 1 and 2 denote members having the same functions as those shown in FIGS. 1 and 2.

Referring to FIG. 3, the compliance unit 260 is provided with a compliance chamber having a predetermined volume to store hydraulic pressure, and an elastic member (not shown) arranged in the chamber. Thereby, the compliance unit 260 is allowed to temporarily store oil (hydraulic oil). That is, the compliance unit 260 supplies, even without opening and closing of the valve, supplies hydraulic pressure to the wheel cylinders 40 when the hydraulic pressure supplied to the wheel cylinders 40 is reduced.

Again referring to FIG. 1, a simulator 150, connected to the master cylinder 20 to provide reaction force according the foot force applied to the brake pedal 10, is provided. According to the illustrated embodiment, the channel connecting the master cylinder 20 to the simulator 150 is connected with the first backup channel 141. The simulator 150 includes a simulation chamber 151 adapted to store oil discharged through the outlet of the master cylinder 20, and a simulation valve 155 arranged at the inlet of the simulation chamber 151. Provided in the simulation chamber 151 are a reaction piston 152 and a reaction spring 153 to elastically support the reaction piston 152. The reaction piston 152 and the reaction spring 153 are caused to perform displacement within a certain range by the oil introduced into the simulation chamber 151. The simulation valve 155 is an NC solenoid valve which is normally in a closed state. Thereby, when the driver depresses the brake pedal 10, the simulation valve 155 is opened to allow the braking oil to be transferred to the simulation chamber 151.

In addition, a simulation check valve 157 is provided between the simulator 150 and the master cylinder 20, i.e., between the simulation chamber 151 and the simulation valve 155. The simulation check valve 157 is connected with the master cylinder 20. The simulation check valve 157 allows pressure according to the foot force applied to the brake pedal 10 to be transferred to the simulation chamber 151 only via the simulation valve 155.

Hereinafter, operation of an electric brake system for a vehicle according to one embodiment of the present invention will be described.

Figure 2:
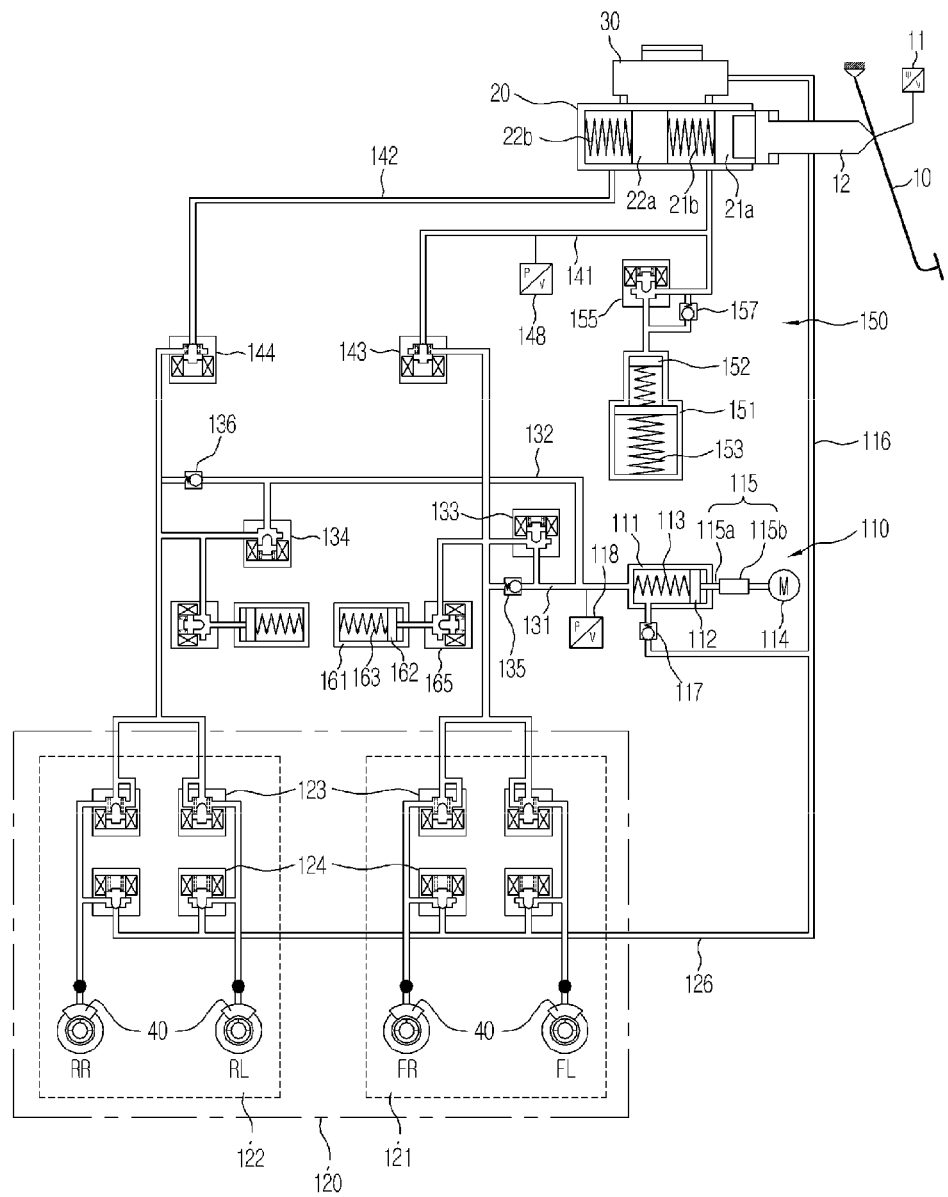
FIG. 2 is a hydraulic circuit diagram illustrating an electric brake system for a vehicle according to one embodiment of the present invention, which is in normal operation.
Figure 3:
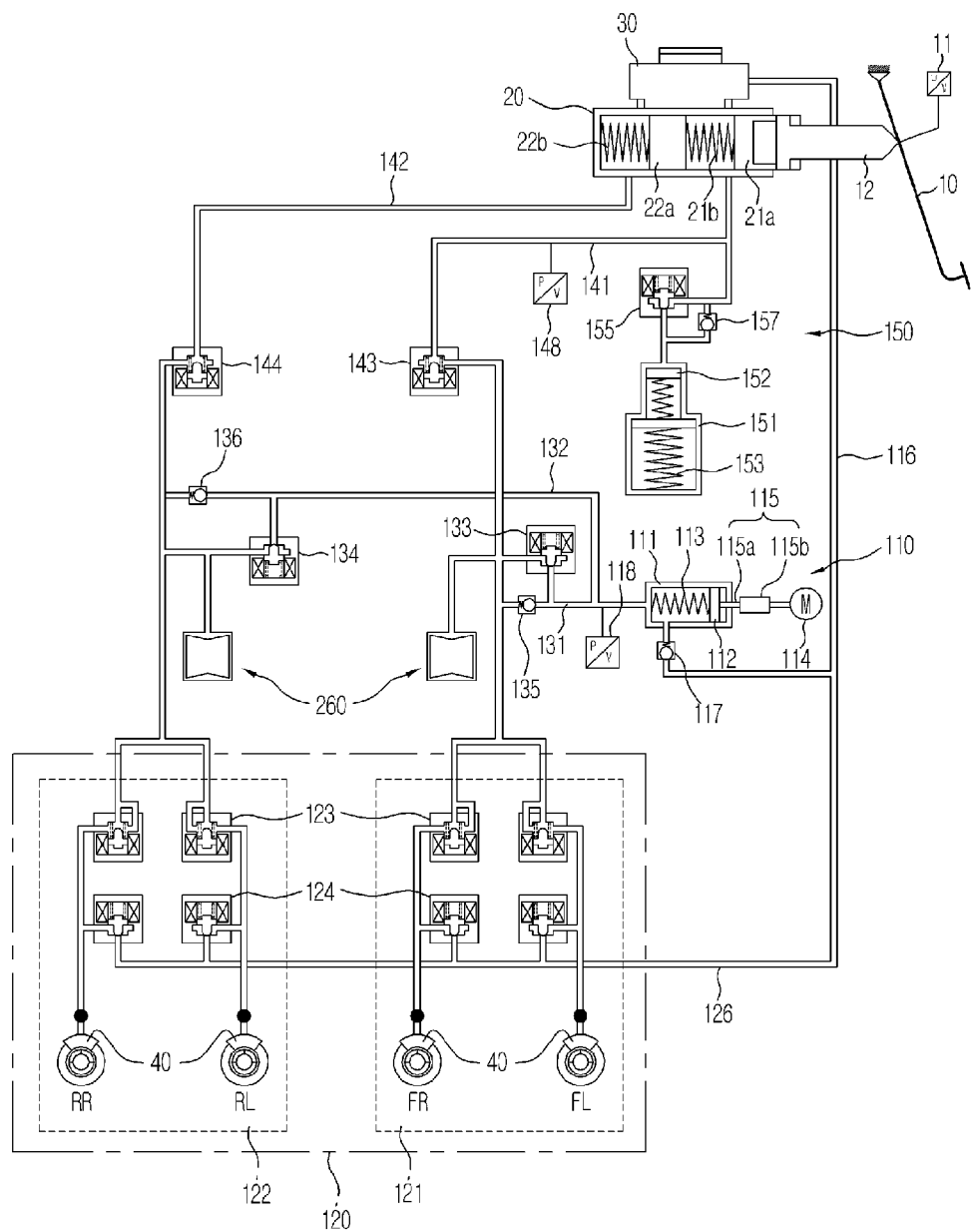
FIG. 3 is a hydraulic circuit diagram illustrating an electric brake system for a vehicle according to another embodiment of the present invention.

FIG. 2 is a hydraulic circuit diagram illustrating an electric brake system for a vehicle in normal operation.

Referring to FIG. 2, when braking is started by the driver, the amount of braking desired by the driver may be sensed through the pedal displacement sensor 11 based on the information about the pressure applied to the brake pedal 10 by the driver. The ECU (not shown) receives an electrical signal output from the pedal displacement sensor 11 and drives the motor 114. In addition, the ECU may receive the magnitude of regenerative braking through the second pressure sensor 148 arranged at the outlet of the master cylinder 20 and the first pressure sensor 118 arranged at the outlet of the pressure supply unit 110, and calculate the magnitude of frictional braking according to the difference between the braking desired by the driver and the regenerative braking. Thereby, the ECU may recognize the magnitude of increase or decrease in pressure at the wheel side.

Specifically, when the driver steps on the brake pedal 10 at the initial stage of braking, the motor 114 operates, and the rotational force of the motor 114 is converted into rectilinear motion to apply pressure to the pressure chamber 111. At this time, the pressure chamber 111 is connected to the reservoir 30 by the hydraulic channel 116 with oil stored therein. According to rectilinear movement of the ball screw member 115, which converts rotational motion into rectilinear motion, hydraulic pressure is generated in the pressure chamber 111. In addition, the first and second shut-off valves 143 and 144 installed in the first and second the backup channels 141 and 142 connected to the outlets of the master cylinder 20 are closed, and thus hydraulic pressure generated in the master cylinder 20 is prevented from being transferred to the wheel cylinders 40. Thereby, the hydraulic pressure generated in the pressure chamber 111 is transferred to the wheel cylinders 40 via the first and second inflow channels 131 and 132. That is, since the first and second switching valves 133 and 134 are opened by the ECU to control the hydraulic pressure supplied to each of the first and second circuits 121 and 122, hydraulic pressure is transferred to the wheel cylinders 40 to produce braking force.

In addition, the pressure generated according to pressurization of the master cylinder 20 by the foot force applied to the brake pedal 10 is transferred to the simulator 150 connected to the master cylinder 20. At this time, the NC type simulation valve 155 disposed between the master cylinder 20 and the simulation chamber 151 is opened and the hydraulic pressure is supplied to the simulation chamber 151. Thereby, the reaction piston 152 is moved, and a pressure corresponding to the load applied to the reaction spring 153 supporting the reaction piston 152 is created in the simulation chamber 151, providing proper pedal feel to the driver.

In the case the ABS cycle is maintained for a long time and thus generation of braking pressure by the pressure supply unit 110 is blocked, the first switching valve 131 is closed, and the pressure piston 112 in the pressure chamber 111 quickly moves backward to suction in the oil from the reservoir 20 through the hydraulic channel 116 and then moves forward again to create hydraulic pressure. While the time the pressure chamber 111 suctions and compresses the oil, the hydraulic pressure is transferred from the compliance unit 116 to the wheel cylinders 40. Thereby, drop in supplied pressure may be prevented.

Next, a description will be given of the electric brake which is not in normal operation. Referring to FIG. 1, when the driver applies pressure to the brake pedal 10, the input rod 12 connected to the brake pedal 10 moves forward to the left at the same time, the first cylinder 21a in contact with the input rod 12 also moves forward to the left. At this time, braking may be quickly performed since there is no gap between the input rod 12 and the first cylinder 21a. That is, the hydraulic pressure generated through pressurization of the master cylinder 20 is transferred to the wheel cylinders 40 through the first and second backup channels 141 and 142 to produce braking force for backup braking. Herein, the first and second shut-off valves 143 and 144 installed in the first and second backup channels 141 and 142 are NO type solenoid valves, while the simulation valve 155 and the first and second switching valves 133 and 134 are NC type solenoid valves. Accordingly, hydraulic pressure is directly transferred to the wheel cylinders 40. Thereby, stable braking may be performed, and thus braking stability may be enhanced.

As such an electric brake system for a vehicle is configured to generate hydraulic pressure by sensing driver intention to brake according to foot force applied to the brake pedal 10, controlling the motor 114 according to an output of an electrical signal, and converting the rotational motion of the motor 114 into rectilinear motion, precise control of hydraulic pressure is possible. In addition, in the case that the brake system malfunctions, the hydraulic braking pressure generated by the driver's foot force is directly transferred to the wheel cylinders 40 through the backup channels 141 and 142. Thereby, braking stability may be improved.

As is apparent from the above description, an electric brake system for a vehicle of the present invention has the following effects.

First, as the electric brake system is configured to generate hydraulic pressure by converting rotational force of a motor into rectilinear motion, precise control of pressure is possible, and the structure of the brake system may be simplified compared to conventional cases.

Second, in the case that the brake system malfunctions, the driver's foot force is directly transferred to the master cylinder to allow braking of the vehicle. Thereby, stable braking force may be provided.

Third, a compliance unit performs hydraulic damping by changing volume thereof and is filled with a certain amount of oil from the pressure chamber during the ABS cycle. Accordingly, when the ABS cycle is maintained for a long time, the stored oil is supplied to the wheel cylinders during suction of oil into the pressure supply unit. Thereby, sudden drop in supplied pressure may be prevented.

Finally, regardless of how the pressure is adjusted during braking, pedal feel provided to the driver may be stabilized.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric brake system for a vehicle, the electric brake system comprising:
   a reservoir configured to store oil,
   a master cylinder provided with two hydraulic circuits and configured to generate a first hydraulic pressure using the oil stored in the reservoir,
   an input rod disposed to contact the master cylinder and configured to move forward according to foot force applied from a driver to a brake pedal,
   a pedal displacement sensor configured to sense a displacement of the brake pedal connected to the input rod,
   a pressure supply unit connected to the reservoir via a hydraulic channel, and configured to
     receive the oil from the reservoir, and
     supply a second hydraulic pressure;
   a hydraulic control unit comprising:
     a first circuit connected to at least one first wheel of the vehicle; and
     a second circuit connected to at least one second wheel of the vehicle
     wherein the first and second circuits are configured to perform braking of one or more of the first and second wheels with the first and second hydraulic pressures supplied by the master cylinder and the pressure supply unit;
   a pressure supply channel connected to the pressure supply unit at one end, and connected to first and second inflow channels at the other end;
   the first inflow channel connecting the pressure supply unit to the first circuit via the pressure supply channel;
   the second inflow channel connecting the pressure supply unit to the second circuit via the pressure supply channel;
   a shut-off valve configured to control the first hydraulic pressure transferred from the master cylinder to a wheel cylinder installed at each wheel;
   switching valves connected to the first and second inflow channels and configured to control the second hydraulic pressure;
   compliance units installed in the first and second inflow channels and connected to the shut-off valve and the switching valves, each of the compliance units comprising:
     a compliance chamber having a predetermined volume varying according to change in pressure, and
     a piston and an elastic member arranged in the compliance chamber;

a simulator connected to the master cylinder and configured to provide reaction force according to the foot force applied to the brake pedal; and an electronic control unit configured to control a motor and the valves based on information about pressure and pedal displacement, wherein the electronic control unit is configured to operate the motor when the driver operates the brake pedal such that rotational motion of the motor is converted into rectilinear motion, wherein each of the compliance units further comprises a compliance valve arranged at an inlet of the compliance chamber, wherein the pressure supply unit comprises:
- a pressure chamber connected to the hydraulic channel, and configured to receive oil supplied thereto from the reservoir;
- a hydraulic piston arranged in the pressure chamber;
- a hydraulic spring arranged in the pressure chamber, and configured to elastically support the hydraulic piston;
- the motor configured to generate the rotational motion according to an electrical signal from the pedal displacement sensor; and
- a ball-screw member comprising a screw and a nut, and configured to convert the generated rotational motion of the motor into the rectilinear motion, wherein the hydraulic piston is connected to the screw, and the screw is configured to rectilinearly move such that the oil in the pressure chamber is pressurized by the hydraulic piston, and wherein the electronic control unit is configured to control the compliance valve of each of the compliance units while oil of the reservoir is suctioned into the pressure chamber, thereby supplying a hydraulic pressure of the compliance units to the wheel cylinder.

2. The electric brake system according to claim 1, wherein the compliance valve is a Normally Closed solenoid valve that remains closed in a normal state and is opened upon receiving a signal for an opening operation from the electronic control unit.

3. The electric brake system according to claim 1, further comprising:
a check valve installed in the hydraulic channel, and configured to
- prevent backflow of pressure from the pressure chamber, and
- allow the oil to be suctioned into and stored in the pressure chamber when the hydraulic piston returns.

4. The electric brake system according to claim 1, wherein the switching valves comprise:
a first switching valve installed in the first inflow channel, and configured to control the second hydraulic pressure in the first inflow channel; and
a second switching valve installed in the second inflow channel, and configured to control the second hydraulic pressure in the second inflow channel.

5. The electric brake system according to claim 4, further comprising:
check valves installed in parallel with the first and second switching valves.

6. The electric brake system according to claim 4, wherein the first and second switching valves are Normally Closed solenoid valves that remain closed in a normal state and are opened upon receiving a signal for an opening operation from the electronic control unit.

7. The electric brake system according to claim 1, wherein the hydraulic control unit further comprises:
a Normally Opened solenoid valve disposed upstream of the wheel cylinder, and configured to control transfer of the first and second hydraulic pressures to the wheel cylinder;
a Normally Closed solenoid valve disposed downstream of the wheel cylinder, and configured to control release of the first and second hydraulic pressures from the wheel cylinder; and
a return channel connecting the Normally Closed solenoid valve to the hydraulic channel.

8. The electric brake system according to claim 1, further comprising:
first and second backup channels connecting the two hydraulic circuits of the master cylinder to the wheel cylinder for controlling the oil to be supplied to the first and second circuits, when the electric brake system malfunctions,
wherein the shut-off valve comprises:
a first shut-off valve installed in the first backup channel, and configured to control connection between the first backup channel and the master cylinder, and
a second shut-off valve installed in the second backup channel, and configured to control connection between the second backup channel and the master cylinder.

9. The electric brake system according to claim 8, wherein the first and second shut-off valves are Normally Opened solenoid valves that remain opened in a normal state and are closed upon receiving a signal for a closing operation from the electronic control unit.

10. The electric brake system according to claim 1, wherein the simulator comprises:
a simulation chamber configured to store the oil discharged from the master cylinder;
a reaction piston arranged in the simulation chamber;
a reaction spring configured to elastically support the reaction piston; and
a simulation valve arranged at an inlet of the simulation chamber.

11. The electric brake system according to claim 10, wherein the simulation valve is a Normally Closed solenoid valve that remains closed in a normal state and is opened upon receiving a signal for an opening operation from the electronic control unit.

* * * * *